(12) United States Patent
Leman

(10) Patent No.: US 6,580,606 B1
(45) Date of Patent: Jun. 17, 2003

(54) MODULAR DRIVE CAGE ASSEMBLY

(75) Inventor: Michael V. Leman, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 83 days.

(21) Appl. No.: 09/669,228

(22) Filed: Sep. 25, 2000

(51) Int. Cl.$^7$ .................................................. G06F 1/16
(52) U.S. Cl. ...................... 361/685; 361/683; 312/223.1
(58) Field of Search ................................. 361/685, 684, 361/683, 724–727; 312/223.1, 223.2; 369/75.1–82

(56) References Cited

U.S. PATENT DOCUMENTS

| | | |
|---|---|---|
| 3,741,564 A | 6/1973 | Schulz |
| 4,479,198 A | 10/1984 | Romano et al. |
| 4,985,804 A | 1/1991 | Campbell et al. |
| 5,154,456 A | 10/1992 | Moore et al. |
| 5,155,662 A | 10/1992 | I-Shou |
| 5,159,528 A | 10/1992 | Murphy |
| 5,164,916 A | 11/1992 | Wu et al. |
| 5,223,996 A | 6/1993 | Read et al. |
| 5,228,319 A | 7/1993 | Holley et al. |
| 5,361,610 A | 11/1994 | Sanders |
| 5,397,176 A | 3/1995 | Allen et al. |
| 5,406,809 A | 4/1995 | Igelmund |
| 5,446,618 A | 8/1995 | Tetsuya et al. |
| 5,462,065 A | 10/1995 | Cusimano |
| 5,469,692 A | 11/1995 | Xanthopoulos |
| 5,481,431 A | 1/1996 | Siahpolo et al. |
| 5,495,389 A | 2/1996 | Dewitt et al. |
| 5,513,651 A | 5/1996 | Cusimano et al. |
| 5,525,799 A | 6/1996 | Andresen et al. |
| 5,526,226 A | 6/1996 | Katoh et al. |
| 5,587,879 A | 12/1996 | Spano et al. |
| 5,612,819 A | 3/1997 | Meyer |
| 5,612,927 A | 3/1997 | Morrison et al. |
| 5,638,456 A | 6/1997 | Conley et al. |
| 5,660,065 A | 8/1997 | Edlund |
| 5,666,267 A | 9/1997 | Carter et al. |
| 5,671,414 A | 9/1997 | Nicolet |
| 5,680,293 A | 10/1997 | McAnally et al. |
| 5,683,159 A | 11/1997 | Johnson |
| 5,691,504 A | 11/1997 | Sands et al. |
| 5,706,168 A | 1/1998 | Erler et al. |
| 5,732,000 A | 3/1998 | Chiesi et al. |
| 5,737,185 A | 4/1998 | Morrison et al. |
| 5,760,989 A | 6/1998 | Colban |
| 5,771,130 A | 6/1998 | Baker |
| 5,787,737 A | 8/1998 | Cho |
| 5,793,608 A | 8/1998 | Winick et al. |
| 5,831,525 A | 11/1998 | Harvey |
| 5,835,298 A | 11/1998 | Edgerton et al. |
| 5,835,346 A | 11/1998 | Albani et al. |
| 5,995,364 A | * 11/1999 | McAnally et al. ........... 361/685 |
| 6,097,591 A | * 8/2000 | Ircha ........................... 361/683 |
| 6,301,105 B2 | * 10/2001 | Glorioso et al. ............. 361/685 |
| 6,317,318 B1 | * 11/2001 | Kim ............................. 361/685 |

* cited by examiner

*Primary Examiner*—Darren Schuberg
*Assistant Examiner*—Lisa Lea-Edmonds
(74) *Attorney, Agent, or Firm*—Knobbe, Martens, Olson & Bear, LLP.

(57) ABSTRACT

A modular drive cage assembly for mounting drives, such as, for example, floppy drives, hard drives, CD ROMs, tape drives or optical drives, into a computer case. The modular drive cage assembly includes standard single drive cages with coupling mechanisms. The coupling mechanisms on the cages engage each other allowing attachment of several single drive cages, producing a drive cage assembly. Following attachment of individual drive cages into a drive cage assembly, the drive cage assembly may be installed in a computer case. Fabrication of the drive cage assembly separately from the computer case allows the assembly to be used in various different computer cases without redesign of the assembly or the computer case.

16 Claims, 9 Drawing Sheets

MODULAR DRIVE CAGE ASSEMBLY

BACKGROUND OF THE INVENTION

1. Field of the Invention

The invention is related to mounting brackets for computers. More specifically, the invention is related to a modular cage assembly for mounting internal devices into computers.

2. Description of the Related Technology

Personal computers have become an integral part of most businesses. Due to increasing sales of personal computers, computer manufacturers look for ways to more efficiently mass-produce their products. Most personal computers are built in an assembly line format with different computer components installed at various positions along the line. Because of the increasing competitiveness in the computer marketplace, the speed and efficiency of both the design and manufacturing processes need to improve in order to more quickly bring new products to market as well as to decrease costs. The ability or lack thereof, to get new products to market quickly and contain manufacturing costs, can translate into the difference between a profitable corporation and one which is unable to be competitive.

Computer manufacturers, when designing a new computer case, typically design a new cage assembly to hold internal devices such as, for example, hard drives, floppy drives, CD-ROMs, tape drives and optical drives. This results in a new cage assembly design for each different computer case. Although the size and shape of the internal devices are standardized, and each have individual cages, these individual cages must be designed and assembled into a final cage assembly for use in each computer case being designed.

Existing cage assemblies are typically made as an integral portion of the computer case design. Often they consist of shelves in the computer case, which accept a device. If the device installed in the case is a standard 5.25 inch format, then it will sit on, and attach to, the shelf usually with screws. If the device is a different size format, such as for example, a 3.5 inch format, the device is mounted and secured to an adapter. The adapter then sits on, and attaches to, the shelf again usually with screws.

These types of cage assembly designs have several drawbacks. For example, because the cage assembly is an integral part of the computer case, each new case design requires the design of a new cage assembly. Designing a new cage assembly for each new computer case increases design time. Increased design time increases both the cost of development as well as time to market. Additionally, because the cage assembly is part of the computer case, devices cannot be installed "off line" from the main manufacturing assembly line. Instead, devices must be installed at one of the stations in the manufacturing line. This requires additional steps to be performed in the main product manufacturing line.

Therefore, there is a need in the art for a modular cage assembly design capable of being used in different computer case designs.

SUMMARY OF THE INVENTION

The invention comprises a modular drive cage assembly for mounting drives such as, for example, floppy drives, hard drives, CD ROMs, tape drives or optical drives, into a computer case. The modular drive cage assembly includes standard single drive cages with coupling mechanisms. The coupling mechanisms on the cages engage each other allowing attachment of several single drive cages, and thereby producing a drive cage assembly. Combining single drive cages into a drive cage assembly allows configuration of a drive cage assembly which supports any desired number of standard drives.

The modular drive cage assembly may be installed in various, different, computer cases. Use of the modular cage assembly in different computer cases eliminates the need for a new cage assemble to be designed for each new computer case design. Reuse of the modular cage assembly saves design time and reduces development costs. Additionally, use of the modular cage assembly allows drives to be installed into the cage assembly prior to installation of the drive cage into the computer case. These features reduce manufacturing time and costs.

BRIEF DESCRIPTION OF THE DRAWINGS

The features, objects and advantages of the invention will become more apparent from the detailed description set forth below when taken in conjunction with the drawings in which like reference characters identify correspondingly throughout, and wherein.

DETAILED DESCRIPTION OF THE INVENTION

Figure 1:
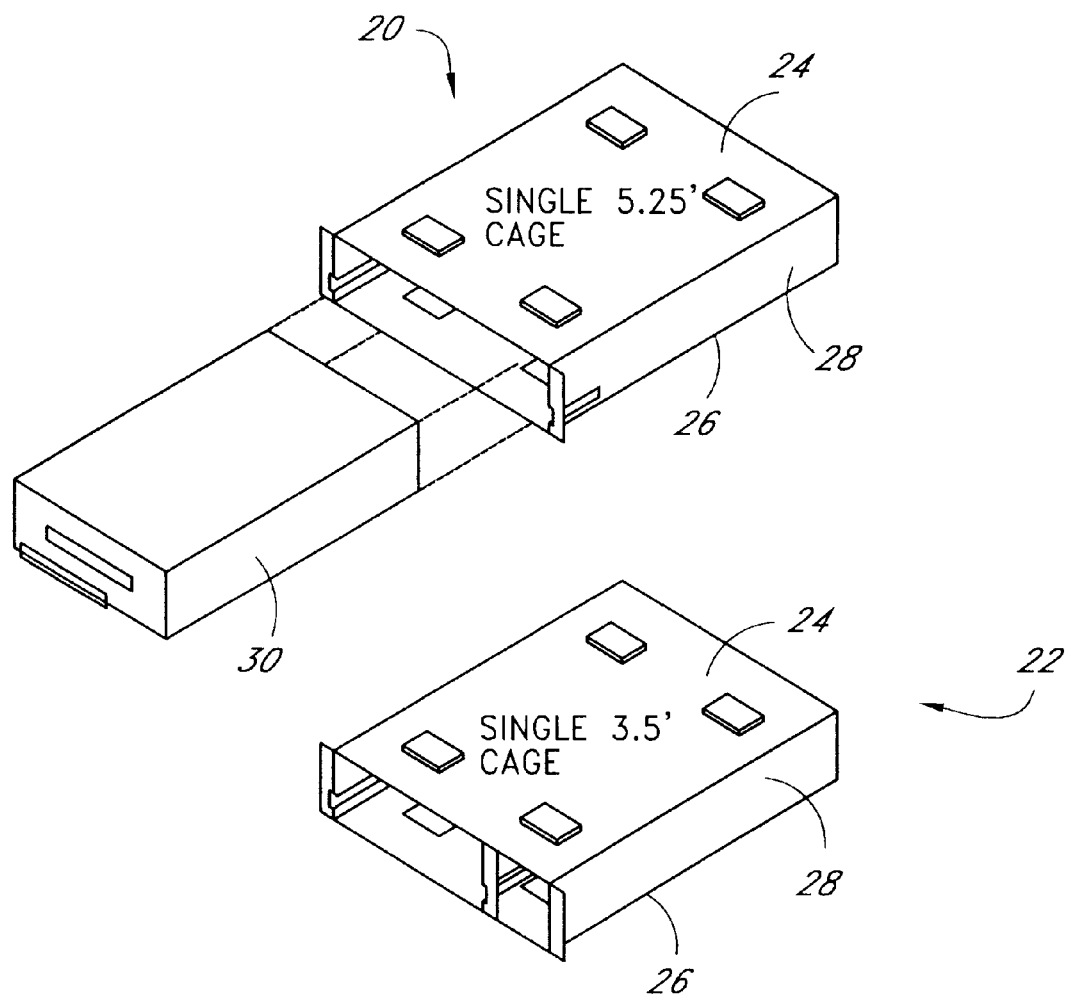
FIG. 1 is a perspective view of a plurality of standard drive cages.

The invention relates to a modular cage design for mounting internal devices into a computer. FIG. 1 shows standard drive cages for a single 5¼ inch drive 20 and a single 3½ inch drive 22. A standard drive cage has an upper surface 24, a lower surface 26 and two side surfaces 28.

Typically, drives are manufactured in a configuration which allows them to be installed into a standard drive cage. A drive such as, for example, a 5¼ inch drive 30 slides into a standard 5¼ drive cage 20 and is attached to the drive cage 20, usually by screws (not shown). Individual drive cages 20 and 22 may be installed into a computer case.

Figure 2:
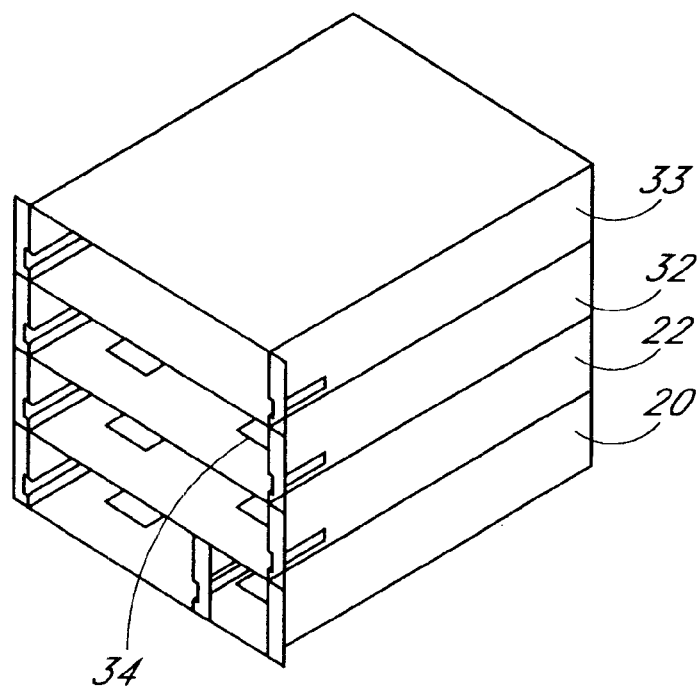
FIG. 2 is a perspective view of one embodiment of a drive cage assembly of the invention.

FIG. 2 illustrates one embodiment of the invention showing one arrangement for attaching two drive cages together. As shown in FIG. 2, single drive cages 20, 22, 32 and 33 are coupled to each other. The drive cages are aligned with each other by use of coupling mechanisms such as those illustrated within line 34. The coupling mechanism can be more fully understood by referring to FIG. 3.

Figure 3:
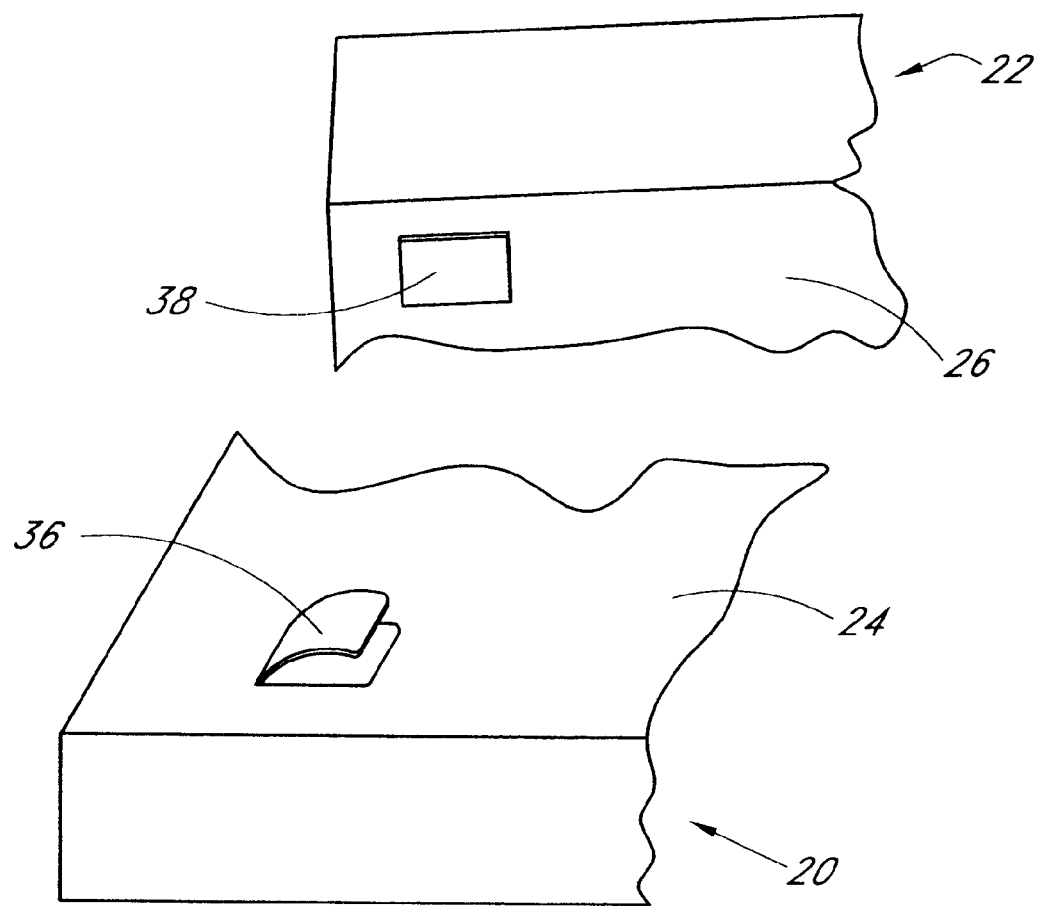
FIG. 3 is an exploded perspective view of the portion of the embodiment of FIG. 2 within line 34.

FIG. 3 is an exploded view of the portion of FIG. 2 within line 34. As shown in FIG. 3, a tab 36 extends from the upper surface 24 of a drive cage 20. The tab 36 protrudes above, and is parallel to, the upper surface 24 of the drive cage 20. In one embodiment illustrated in FIG. 3, the tab 36 comprises a portion of the upper surface 24 that has been raised upward away from the upper surface 24. In another embodiment, the tab 36 may be a separate "L" shaped piece that is attached to the upper surface 24.

Also shown in FIG. 3 is a receiving slot 38 located in the lower surface 26 of drive cage 22. The receiving slot 38 comprises a rectangular hole cut into the lower surface 24 of drive cage 22. The size of the receiving slot 38 substantially corresponds to the size of the tab 36 so that the tab 36 may be extended into the slot 38. A plurality of tabs 36 may be located on the upper surface 24 of drive cage 20 and a corresponding plurality of receiving slots 38 may be located on the lower surface 26 of drive cage 22.

In the embodiment illustrated in FIG. 3, attachment of two drive cages is accomplished by placing drive cage 22 on top of drive cage 20. The two drives are then slid in relation to each other so that the tab 36 on the upper surface 24 of drive 20 engages the receiving slot 38 located on the lower surface 26 of drive 22. When tab 36 is fully engaged in receiving slot 38 the two drive cages are aligned in a desired position relative to each other. In addition to aligning the drive cages, tab 36 is biased such that when it has passed through the slot 28, it exerts a force against a portion of the lower surface 26 of drive cage 22. The force exerted by tab 36 against lower surface 26 maintains the two drive cages in the desired alignment. Using the attachment technique illustrated in FIG. 3, a plurality of drive cages may be assembled into a cage assembly. For example, FIG. 2 illustrates four drive cages 20, 22, 32 and 33 attached into a drive cage assembly.

Although the embodiment of FIG. 2 and FIG. 3 defines drive cages with tabs on the upper surface of a lower cage and receiving slots on the lower surface of an upper cage, it is contemplated that the tabs may be located on the lower surface of the upper cage and receiving slots located on the upper surface of the lower cage. In addition, both tabs and slots may be located on both surfaces of the drives.

Figure 4:
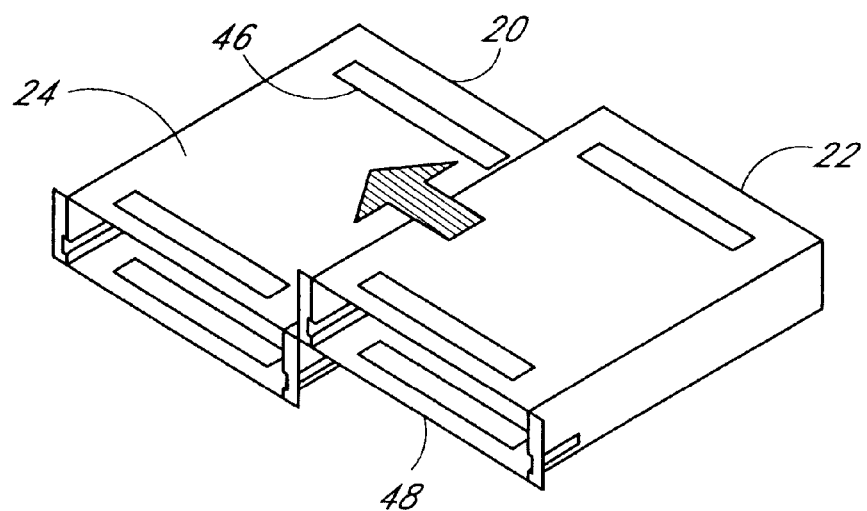
FIG. 4 is a perspective view of another embodiment of a drive cage assembly of the invention.

FIG. 4 illustrates another embodiment of the invention. As illustrated in this embodiment, drive cage 20 has a ridge 46 located on its upper surface 24 and extending across at least a portion of the width of the drive cage. In one embodiment, the ridge 46 may be a portion of the upper surface 24 that has been raised, forming an "L" shape. In another embodiment, the ridge 46 may be a separate "L" shaped strip that is attached to the upper surface 24. Drive cage 22 has a trough 48 located on its lower surface 26 configured to mate with ridge 46 when drive cage 20 is placed below drive cage 22. In particular, ridge 46 and trough 48 engage when drive cage 22 is slid across the top of drive cage 20. When ridge 46 is fully engaged with trough 48 the outer surface of the two drive cages 20 and 22 are aligned in a desired position in relation to each other. In addition to aligning the drive cages, ridge 46 and trough 48 may maintain the two drive cages into a desired position. Arrangement of ridges 46 and troughs 48 on corresponding surfaces allows a plurality of drive cages to be coupled together. In other embodiments, the ridges 46 and troughs 48 may run along the length of the drive cage. Also, the ridges and troughs may be swapped, with the ridge 46 located on the top drive 22 and the trough 48 located on the bottom drive 20.

Figure 5:
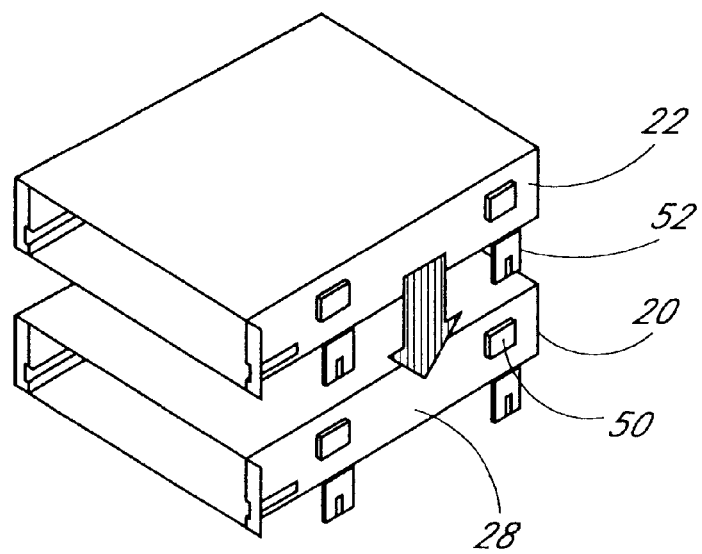
FIG. 5 is a perspective view of another embodiment of a drive cage assembly of the invention.

FIG. 5 illustrates another embodiment of the invention. As illustrated in FIG. 5, drive cage 20 has receiving slots 50 mounted on the sides 28 of the drive cage. In one embodiment, the receiving slots 50 are "u" shaped brackets mounted on the sides 28 of the drive cage. The "u" shaped bracket and the adjacent surface of the cage form receiving slots 50. The receiving slots 50 are a size and shape that substantially correspond to those of tabs 52 located on drive cage 22. In other embodiments, the receiving slots 50 may be different sizes and shapes.

Drive cage 22 has tabs 52 mounted on its sides corresponding to the location of the receiving slots on drive cage 20. In one embodiment, the tabs are rectangular shaped pieces with a cross section to match the opening in a receiving slot 50. In other embodiments, the tabs may be different shapes to match different receiving slot 50 openings. As drive cage 22 is lowered onto drive cage 20 the tabs 52 extend into receiving slots 50, aligning drive cages 20 and 22 to each other. Additionally, the tabs and slots may maintain the position of the two slides relative to each other. Arranging tabs 52 and corresponding slots 50 on drive cages allows a plurality of drive cages to be coupled together into a drive cage assembly of a desired number of drive cages.

Although FIG. 5 illustrates a top drive cage 22 having tabs 52 and a lower drive cage 20 having receiving slots 50, it is contemplated that the top drive cage 22 may have receiving slots 50 and the lower drive 20 may have corresponding tabs 52. In addition, both tabs 52 and receiving slots 50 may be located on the same drive cage, with corresponding receiving slots 50 and tabs 52 located on the mating drive cage.

Figure 6:
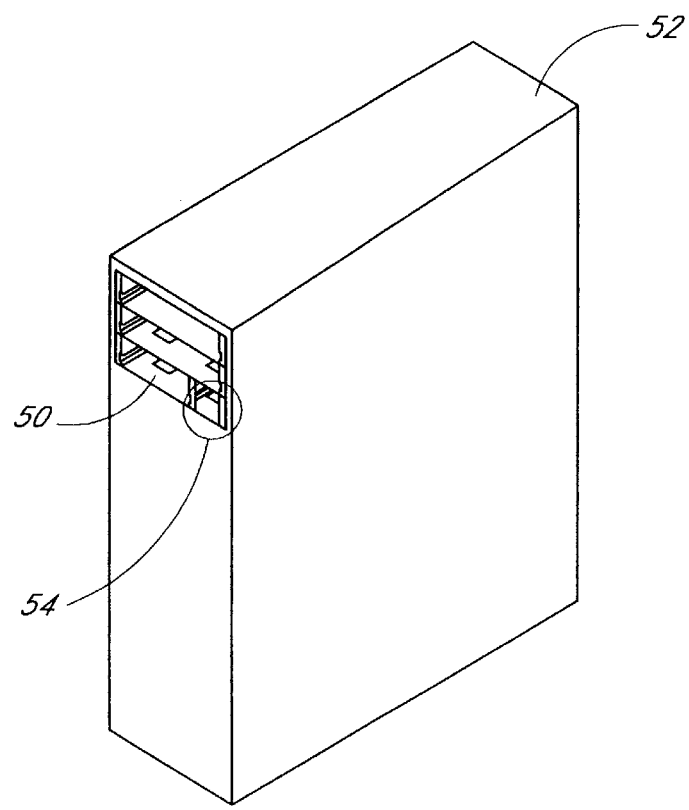
FIG. 6 is a perspective view of a drive cage assembly installed in a computer case.

FIG. 6 shows a drive assembly 50 mounted into a computer case 52. As shown in FIG. 6, the drive cage assembly 50 slides into an opening in the computer case 52 and is secured to the computer case by a securing mechanism 56, within line 54, which is better defined with reference to FIG. 7. With the drive cage assembly 50 securely mounted in the computer case 52, drives may now be installed into the drive cage assembly 50. For example, as shown in FIG. 6, a 3.5 inch drive, and two 5.25 inch drives may be installed within the drive cage assembly. In other embodiments, different configurations of drive cages and drives may be installed into a computer case. In yet another embodiment, the drives may be installed in drive cage assembly 50 before drive cage assembly 50 is installed in computer case 52.

Figure 7:
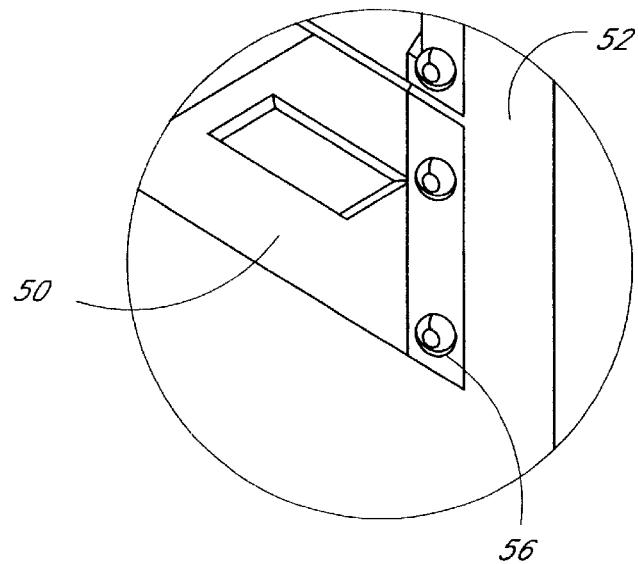
FIG. 7 is an enlarged view of the portion of FIG. 6 within line 54.

FIG. 7 is an exploded view of the portion of FIG. 6 within line 54. FIG. 7 illustrates one embodiment of a securing mechanism for attaching the drive cage assembly 50 into the computer case 52. As shown, after the drive cage assembly 50 is located in a desired position, a securing mechanism 56 attaches the cage assembly 50 to the computer case 52. In one embodiment, the securing mechanism 56 is a screw. In other embodiments, different securing mechanisms may be used, such as, for example, rivets or spot welds.

Figure 8:
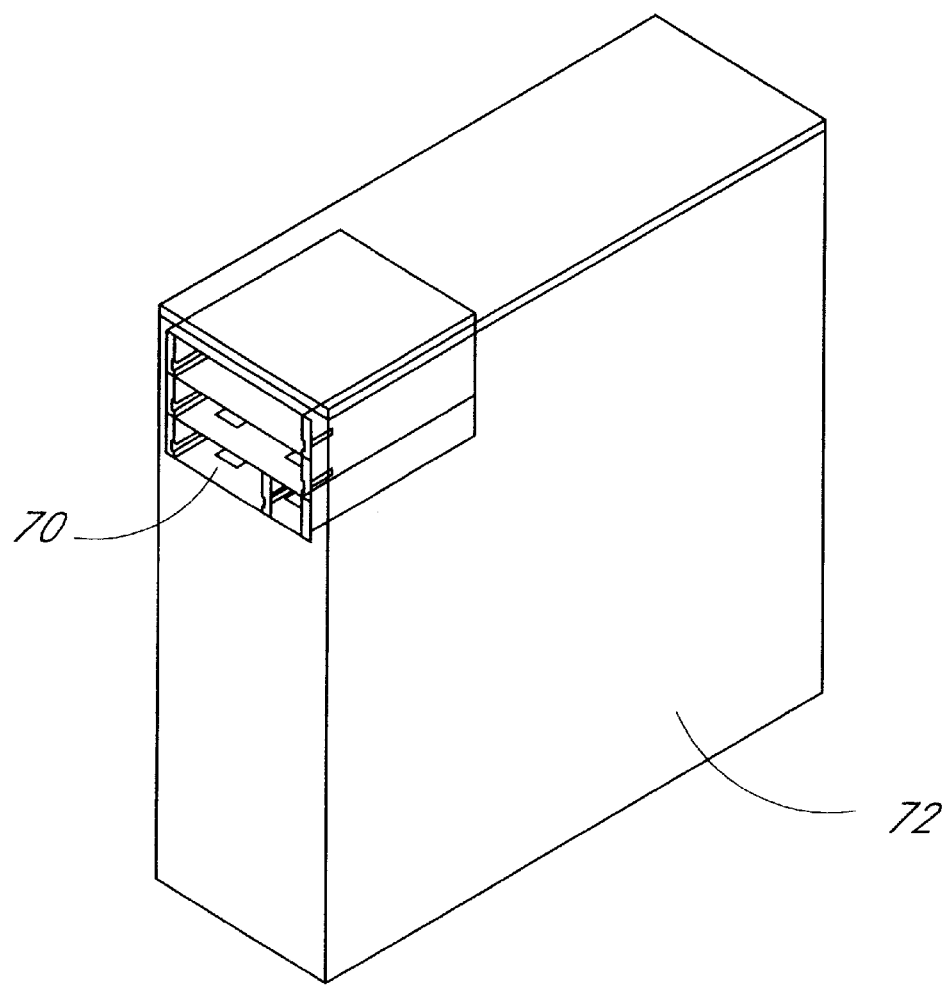
FIG. 8 is a perspective view of one embodiment of a drive cage assembly installed in a tower configured computer case.

FIG. 8 illustrates one embodiment of the invention where a typical drive cage assembly is installed in one configuration of a computer case. As illustrated in FIG. 8, a three drive cage assembly 70 is installed in a tower configuration computer case 72. The drive cage assembly 70 may be secured to the tower configuration computer case 72 by a securing mechanism, such as, for example, one of the mechanisms illustrated in FIG. 7.

Figure 9:
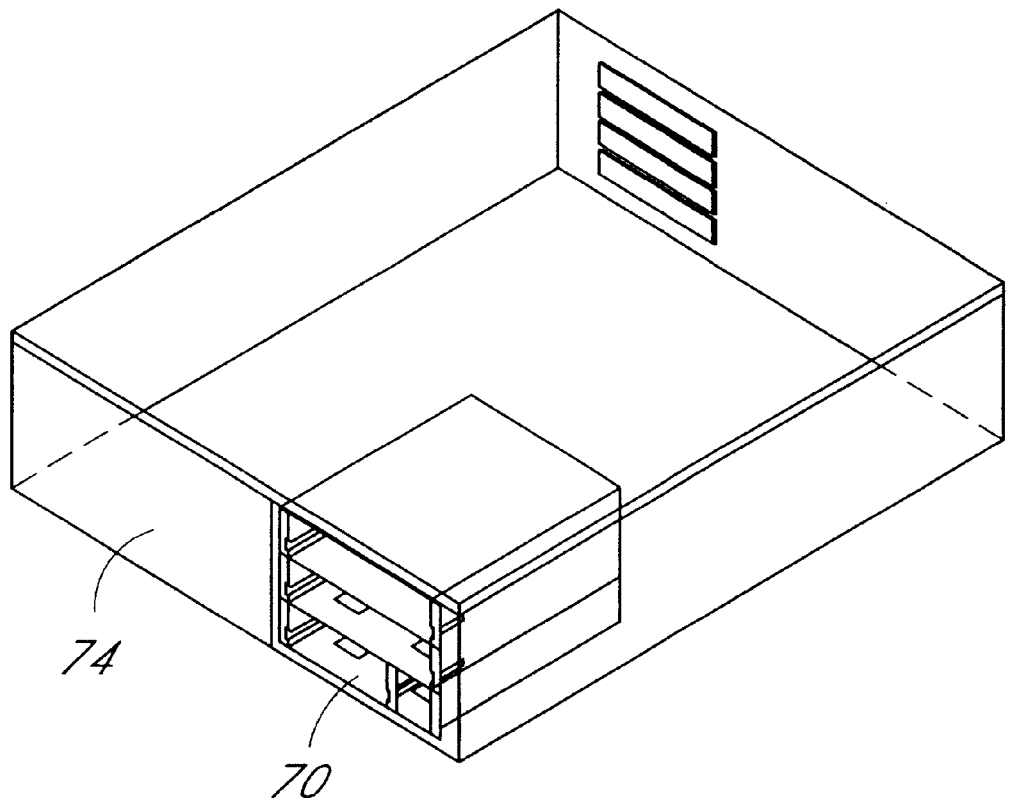
FIG. 9 is a perspective view of one embodiment of a drive cage assembly installed in a desktop configured computer case.

FIG. 9 shows another embodiment of the invention. In this embodiment, the same three drive cage assembly 70 is installed in a desktop configured computer case 74. FIGS. 8 and 9 illustrate one aspect of the invention, where the same drive cage assembly 70 can be used in two different computer case configurations 72 and 74.

Figure 10:
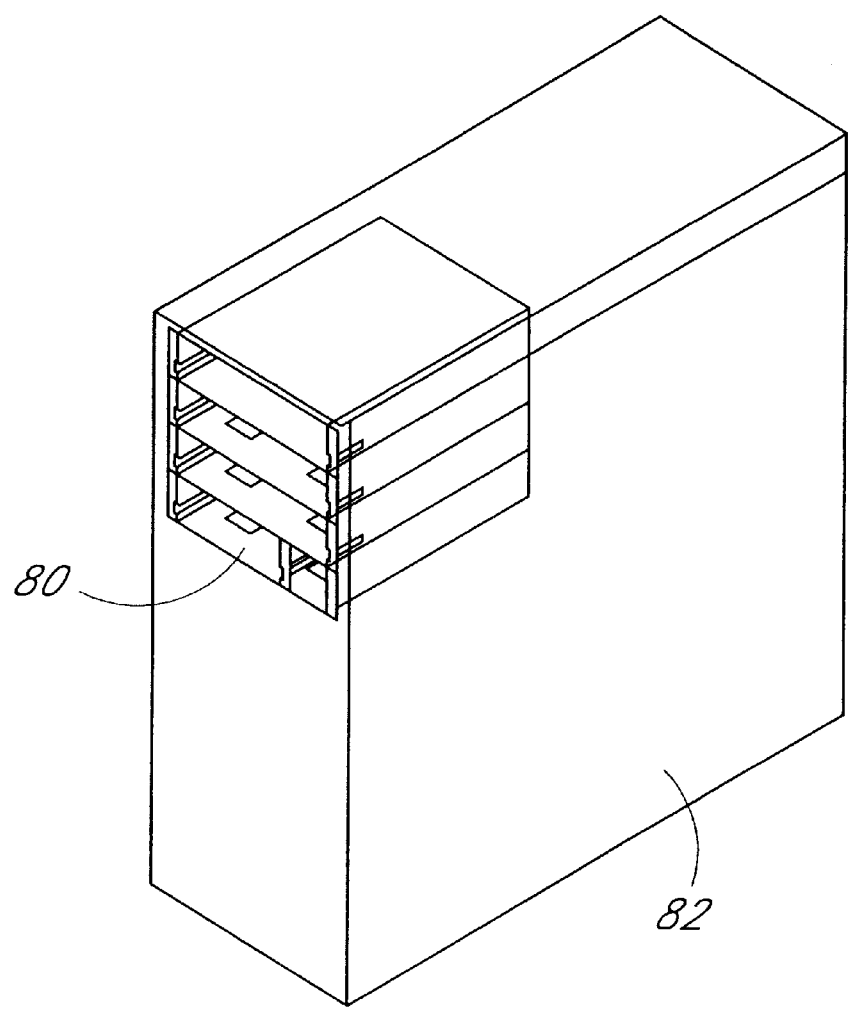
FIG. 10 is a perspective view of another embodiment of a drive cage assembly installed in a tower configured computer case.

FIG. 10 shows another embodiment of the invention. As shown, a drive cage assembly 80 made up of four individual drive cages is installed in a tower configured computer case 82.

Figure 11:
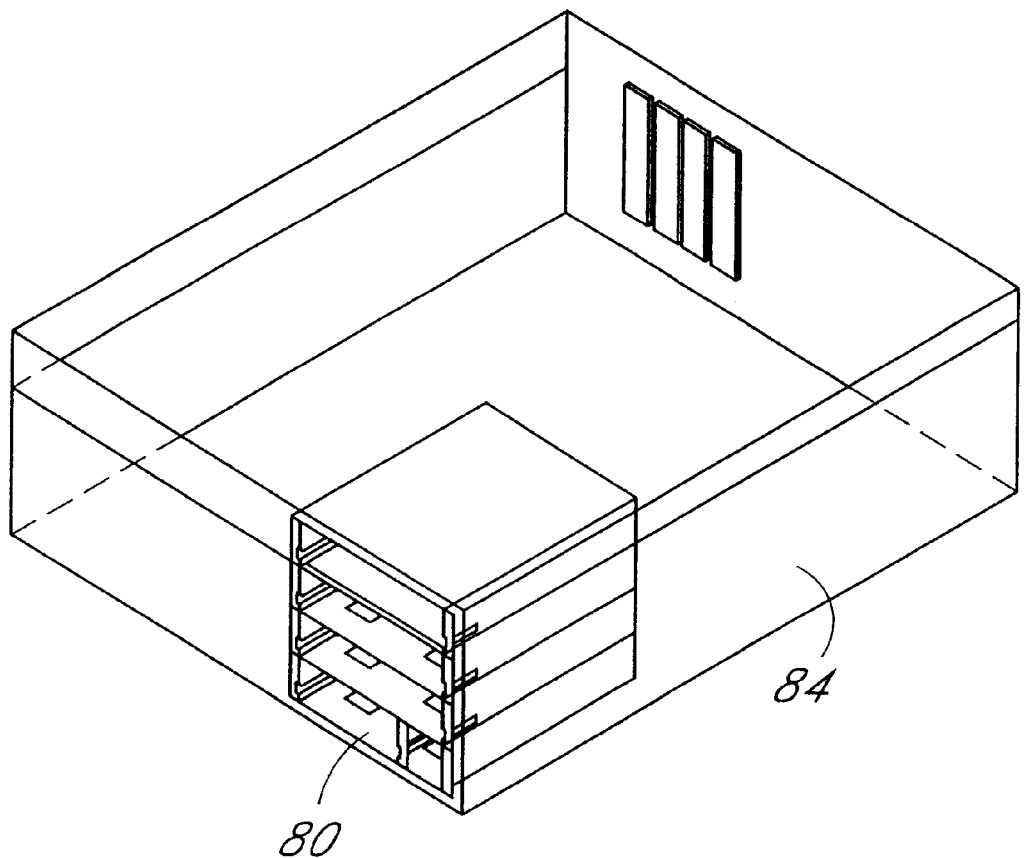
FIG. 11 is a perspective view of another embodiment of a drive cage assembly installed in a desktop configured computer case.

FIG. 11 shows another embodiment of the invention wherein the same four drive cage assembly 80 illustrated in FIG. 10 in a tower configured computer case 82 is now installed in a desktop configured computer case 84. FIGS. 10 and 11 illustrate an aspect of the invention where the same drive cage assembly 80 may be installed into two different computer case configurations 82 and 84.

In view of the foregoing, it will be appreciated that the invention overcomes the long-standing problem in the art of having to design a new drive cage system for each new computer case by providing a modular drive cage assembly that can be used in multiple, different computer cases. The modular cage assembly has standardized drive cages with coupling mechanisms located at related positions on adjacent cages so that multiple cages can be quickly positioned in a desired configuration. In addition, the modular designs provide for inserting drives into the cage assembly, and then installing the cage, with the drives, into the computer case. Alternatively, the drive cage assembly can be installed into the computer case and then the drives installed into the cage assembly.

The foregoing description details certain embodiments of the invention. It will be appreciated, however, that no matter how detailed the foregoing appears, the invention may be embodied in other specific forms without departing from its spirit or essential characteristics. A described embodiment is to be considered in all aspects only as illustrative and not restrictive, and the scope of the invention is therefore indicated by the appended claims rather than the foregoing description. All changes which come within the meaning and range of equivalency of the claims are to be embraced within their scope.

What is claimed is:

1. A modular drive cage system for mounting drives into a computer case, comprising:

a first cage, having a tab extending substantially perpendicular to a top surface of the first cage, the first cage configured to mount a first drive;

a second cage, having a member positioned on a side of the second cage and configured such that said member and said side cooperate to define a receiving slot, the second cage configured to mount a second drive; and wherein the tab extends into the receiving slot to secure the first cage to the second cage.

2. The modular drive cage system of claim 1, wherein the first drive is a device selected from a group including: a floppy drive, a hard drive, a CD-ROM drive, a tape drive, and an optical drive.

3. The modular drive cage system of claim 1, wherein the second drive is a device selected from a group including: a floppy drive, a hard drive, a CD-ROM drive, a tape drive, and an optical drive.

4. The modular cage drive system of claim 1, wherein the member positioned on the side of the second cage comprises a bracket.

5. A computer system comprising:

a first cage, having a tab extending substantially perpendicular to a top surface of the first cage, the first cage configured to mount a first drive;

a second cage, having a member positioned on a side of the second cage and configured such that said member and said side cooperate to define a receiving slot, the second cage configured to mount a second drive;

a computer case configured to mount the first cage and the second cage; and wherein the tab extends into the receiving slot to secure the first cage to the second cage.

6. The computer system of claim 5, wherein the first drive is a device selected from a group including: a floppy drive, a hard drive, a CD-ROM drive, a tape drive, and an optical drive.

7. The computer system of claim 5, wherein the second drive is a device selected from group including: a floppy drive, a hard drive, a CD-ROM drive, a tape drive, and an optical drive.

8. The computer system of claim 5 wherein the computer system further comprises a computer selected from a group including: a personal computer, a minicomputer, and a mainframe.

9. The modular cage drive system of claim 5, wherein the member positioned on the side of the second cage comprises a bracket.

10. A modular drive cage system for mounting drives into a computer case, comprising:

a first cage for mounting a first drive, the first cage having a tab extending substantially perpendicular to a top surface of the first cage;

a second cage for mounting a second drive, the second cage having a receiving slot extending from a surface substantially perpendicular to a top surface of the second cage, the tab from the first cage extending into the receiving slot to secure the first cage to the second cage; and means for securing the first cage to the computer case.

11. The modular cage drive system of claim 10, wherein the member positioned on the side of the second cage comprises a bracket.

12. A method of mounting drives into a computer system, the method comprising:

mounting a first drive into a first cage, the first cage having a tab extending substantially perpendicular to a top surface of the first cage;

mounting a second drive into a second cage, the second cage having a member positioned on a side of the second cage and configured such that said member and said side cooperate to define a receiving slot;

securing the first cage to the second cage by engaging the tab from the first cage with the receiving slot on the second cage to define a cage system; and mounting the cage system into a computer case.

13. The method of claim 12, further comprising selecting the first drive from a group including: a floppy drive, a hard drive, a CD-ROM drive, a tape drive, and an optical drive.

14. The method of claim 12, further comprising selecting the second drive from a group including: a floppy drive, a hard drive, a CD-ROM drive, a tape drive, and an optical drive.

15. The method of claim 12, further comprising mounting the drives in a computer selected from a group including: a personal computer, a mini-computer, and a mainframe.

16. The method of claim 12, wherein the member positioned on the side of the second cage comprises a bracket.

* * * * *